United States Patent [19]

Fujiwara et al.

[11] Patent Number: 5,241,401
[45] Date of Patent: Aug. 31, 1993

[54] IMAGE SIGNAL ENCODING APPARATUS AND METHOD FOR CONTROLLING QUANTIZATION STEP SIZE IN ACCORDANCE WITH FRAME SKIP NUMBERS

[75] Inventors: Hiroshi Fujiwara; Hiroo Uwabu; Masanori Maruyama; Eiji Kakii, all of Tokyo, Japan

[73] Assignee: Graphics Communication Technologies Ltd., Tokyo, Japan

[21] Appl. No.: 752,072

[22] Filed: Aug. 29, 1991

[30] Foreign Application Priority Data

Feb. 15, 1991 [JP] Japan .................................. 3-44236

[51] Int. Cl.$^5$ ............................................. H04N 7/12
[52] U.S. Cl. ..................................... 358/404; 358/133
[58] Field of Search ........................... 358/133-136, 358/404, 403

[56] References Cited

U.S. PATENT DOCUMENTS

| | | | |
|---|---|---|---|
| 4,894,713 | 1/1990 | Delonge et al. | 358/133 |
| 4,951,140 | 8/1990 | Ueno et al. | 358/136 |
| 5,089,888 | 2/1992 | Zdepski et al. | 358/133 |
| 5,126,842 | 6/1992 | Andrews et al. | 358/133 |

FOREIGN PATENT DOCUMENTS 4134999  6/1992  Fed. Rep. of Germany.

Primary Examiner—Stephen Brinich
Attorney, Agent, or Firm—Iandiorio & Dingman

[57] ABSTRACT

An image signal encoding apparatus having a control means for detecting a degree of redundancy of an inputted image signal and for conducting frame skip control based on a frame skip number determination and a determined skip number, an encoding processing means for processing a frame signal indicated by a transmission from said control means by block units into which a screen is divided, quantizing this signal, and encoding and outputting this signal through the medium of a transmission buffer, and a step size control means for controlling the step size of the quantization, characterized in that the step size control means comprises a correction buffer amount calculation means, which calculates a correction buffer amount indicating an excess in the transmission buffer from the frame skip number and a previously supplied transmission speed, and a step size calculation means, which outputs a quantization step size which is smaller as the correction buffer amount indicates a larger excess of the transmission buffer.

2 Claims, 4 Drawing Sheets

IMAGE SIGNAL ENCODING APPARATUS AND METHOD FOR CONTROLLING QUANTIZATION STEP SIZE IN ACCORDANCE WITH FRAME SKIP NUMBERS

BACKGROUND OF THE INVENTION

1. Field of the Invention

The present invention relates to an apparatus which encodes image signals by means of image processing and particularly to an image signal encoding apparatus which appropriately controls quantization step size in accordance with frame skip numbers or generated data amounts.

2. Prior Art

In apparatuses which encode and transmit image signals, the amount of code which is generated varies greatly depending on the degree of movement of the subject images. On the other hand, as the capacity of the transmission path is predetermined, a buffer memory is used for the purpose of smoothing the fluctuating generated data. Furthermore, a method is known for appropriately controlling the quantization step size in accordance with the amount of generated data and thus controlling the degree of space resolution. For example, in Japanese Patent Application, First Publication Laid Open Number SHO 63-3586, an apparatus was disclosed which appropriately controlled a quantization threshold by means of a control circuit from the accumulation amount of a buffer memory.

In the above-described prior art, quantization step size was controlled directly according to the accumulation amount of a transmission buffer memory or according to movement vector data, and precise quantization step size control in accordance with the amount of use of the buffer or variations in transmission data amount could not be conducted, so that there was a problem in that improvement in picture quality was insufficient.

SUMMARY OF THE INVENTION

It is accordingly an object of the present invention to provide, in an image signal encoding apparatus which is capable of variable frame rate operation, an image signal encoding apparatus which is capable of conducting quantization step size control which predicts variations in the amount of buffer use and which is capable of high quality image transmission in accordance with the demands of the user by means of the external indication of an update determination base amount of the quantization step size.

In order to accomplish the above object, the quantization step size is controlled by means of a correction buffer calculation means, which calculates a correction buffer amount which indicates the surplus of the above-mentioned transmission buffer from the frame skip number and a previously supplied transmission speed, and a step size calculation means, which outputs a quantization step size which becomes smaller as the correction buffer amount becomes larger, indicating a transmission buffer surplus. Furthermore, when the quantization step size is outputted from the above-described step size calculation means, quantization is conducted by means of the above described outputted step size only when the difference between the output step size and the step size which was used immediately previously exceeds a specified value which is supplied externally.

In encoding apparatuses having variable frame rates, the larger the frame skip number, or the greater the transition speed, the larger the buffer amount which can be used. Accordingly, the surplus buffer amount which can be used can be predicted from the frame skip number and the transmission speed and if this is so controlled that as the surplus becomes large, the quantization step becomes small, quantization can be conducted by means of the smallest step size within such a range that the transmission buffer does not overflow, and good quality image transmission can be conducted. Furthermore, when the difference between the step size thus determined and the immediately previous value is smaller than a specified value, the step size is not updated, and thereby the updating data can be limited.

By means of the present invention, in the case in which the stepping of image frames is conducted, by means of the introduction of a correction buffer accumulated amount which predicts the increase or decrease in the buffer accumulated amount, it is possible to conduct more accurate quantization step size control, and accordingly, it is possible to transmit high quality images.

DETAILED DESCRIPTION OF THE PREFERRED EMBODIMENTS

Figure 1:
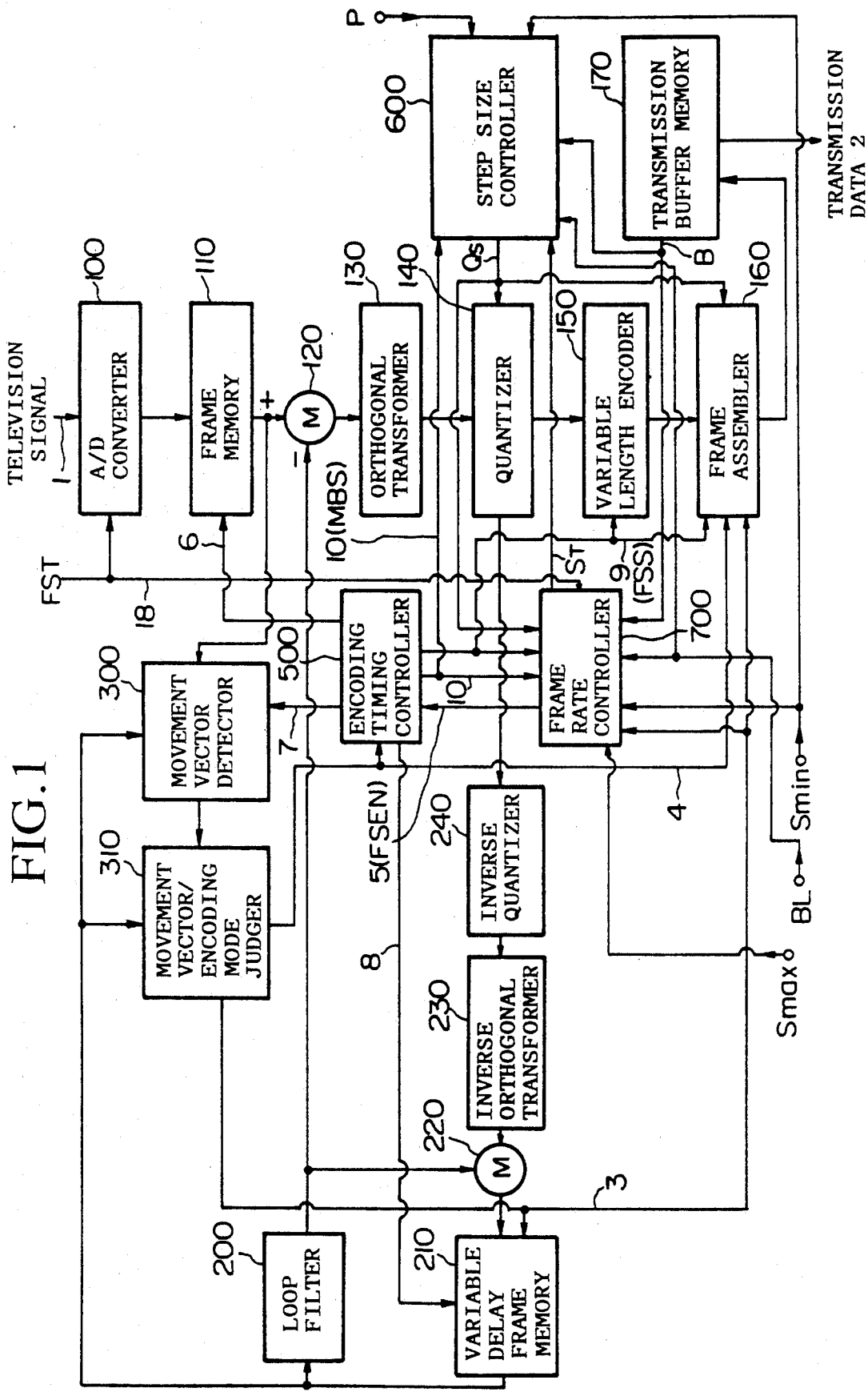
FIG. 1 is a block diagram showing a preferred embodiment of the image signal encoding apparatus of the present invention.

Hereinafter the preferred embodiments of the present invention will be explained with reference to the diagrams. FIG. 1 shows a preferred embodiment of the present invention; it is used in a communication system having limited transmission data amounts. The image signal encoding apparatus of the present preferred embodiment makes use of frame interval encoding using orthogonal transformation and movement compensation by means of movement vectors. Television signal 1 is converted into a digital image signal in A/D converter 100, and is stored in frame memory 110. As described hereinbelow, the regeneration image signal of the previous frame, which has been locally decoded, is stored in variable delay frame memory 210, this image signal is inputted into subtracter 120 through loop filter 200, the difference between it and the present frame image is calculated, and a difference signal is inputted into orthogonal transformer 130. Among present orthogonal transformation methods, the discrete cosine transform method is common, wherein the screen of one frame is divided into a number of blocks, and a cosine transformation is conducted with respect to the image data of each of the blocks (for example, 8 by 8 pixels). The transformation signal which has been orthogonally transformed is quantized to a linear or nonlinear discrete level in quantizer 140, is encoded into a variable length code corresponding to the generation frequency by means of variable length encoder 150, and is then inputted into frame assembler 160. In frame assembler 160, frames which are used for transmission are assembled from the encoded image data and additional data (movement vectors 3, encoding modes 4), this is stored in transmission buffer memory 170, and is transmitted by the communication circuit as transmission data 2.

This embodiment of the present invention comprises a local decoding loop. That is, the output of quantizer 140 is made into a regeneration image signal by means of inverse quantizer 240 and inverse orthogonal transformer 230, and this is added to the data of the previous frame by adder 220 and is stored in variable delay frame memory 210. Movement vector detector 300, which is necessary for movement compensation, detects movement by means of pattern matching processing between the present frame input and the previous frame input, the results thereof are inputted into movement vector judgement/encoding mode judger 310, and movement vector 3 and encoding mode 4 are generated as additional data. Encoding timing controller 500 has inputted thereinto encoding mode 4 and encoding frame starting enable signal (FSEN) 5, and generates and outputs frame memory control signal 6, movement vector detection control signal 7, variable delay memory control signal 8, encoding frame starting signal (FSS) 9, and encoding block synchronization signal (MBS) 10. Frame rate controller 700 controls the encoding timing controller 500 and controls the image processing frame rate of the entire apparatus. Minimum and maximum frame skip number setting values $S_{min}$ and $S_{max}$, buffer limit value $B_L$ and frame lock signal (FST) 18 are inputted as externally set signals into frame rate controller 700, and furthermore, movement data 3, buffer accumulated amount B, encoding frame starting signal 9, encoding block synchronization signal 10, and step size $Q_S$ are inputted as internal signals. Based on these inputs, the encoding frame start enable signal 5 is generated by a predetermined method, and the image frame which will be processed by the apparatus is selected and controlled.

The above-described operation is identical to that of a conventional apparatus; however, step size controller 600 determines the width of the discrete level in quantizer 140 (termed the step size), and thus represents a distinctive feature of the present invention. Here, encoding block synchronization signal 10, total frame skip number $S_T$, buffer accumulation amount B, transmission speed setting value P, which is an externally set signal, minimum frame skip number setting value $S_{min}$, and buffer limit value $B_L$ are inputted into step size controller 600, and step size $Q_S$ is outputted.

Figure 2:
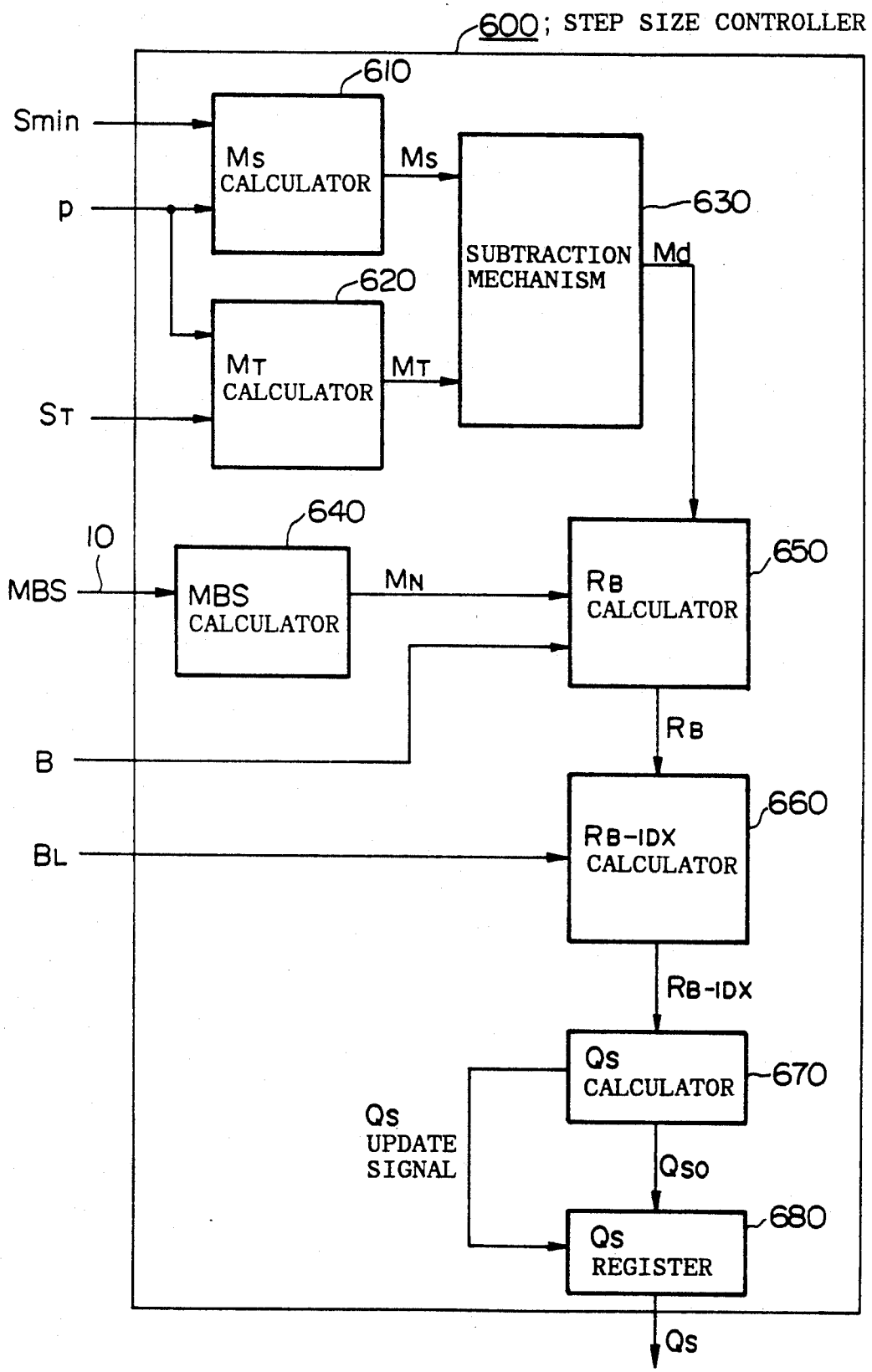
FIG. 2 is a block diagram showing a concrete structural example of the step size controller.

FIG. 2 shows a concrete structural example of the step size controller 600 which represents a distinctive feature of the present invention. The screen is divided into blocks consisting of 8 by 8 pixels, and 4 neighboring blocks representing the luminance signal of the images and two blocks corresponding spatially to luminance areas representing chrominance signals, for a total of 6 blocks, are termed a macroblock (MB). Furthermore, encoding processing is conducted using 1 microblock as a unit; 1 frame comprises 396 microblocks. If, at this time, a state is assumed in which S frame skipping is conducted and 1 frame is transmitted, the number of frames transmitted in 1 second is 30/(1+S), and a number of microblocks equalling 396 times this amount is encoded in one second. If the bit number at the time of the encoding of 1 microblock is assumed to be M, the number of bits which are encoded and outputted in one second is $$\frac{30 \times 396 \, M}{(1 + S)} \text{ bits.} \tag{1}$$

On the other hand, the transmission speed setting value P results in a transmission speed of $64P \times 10^3$ bits per second, so that when this is greater than the value of formula (1), transmission is possible without an increase in the buffer accumulation amount B. In other words, when the value of the encoding bit number M corresponding to 1 macroblock is less than a value indicated by the formula $$M = 64 \times 10^3 \, P \frac{(1 + S)/30}{396} \simeq 5P(1 + S), \tag{2}$$

the value of buffer accumulation amount B does not increase. If the value of formula (2) is taken to be the number of usable bits corresponding to 1 macroblock, in the $M_S$ calculator 610 of FIG. 2, the value of formula (2) when skip number S has been set to the value of minimum frame skip number setting value $S_{min}$ is calculated as base usable bit number $M_S$;

$$M_S = 5P(1 + S_{min}). \tag{3}$$

Furthermore, in $M_T$ calculator 620, the value of formula (2) when skip number S has been set to the present value of total frame skip number $S_T$ is calculated as present usable bit number $M_T$:

$$M_T = 5P(1 + S_T). \tag{4}$$

Next, when $M_D = M_T - M_S$ (is greater than 0) is found in subtraction mechanism 630, this indicates the surplus bit number over the base usable bit number corresponding to 1 macroblock. On the other hand, the encoding block synchronization signal (MBS) 10 is counted in MBS counter 640 and the macroblock number $M_N$ is determined, and a correction accumulation buffer amount $R_B$ is calculated from this, the above described excess bit number $M_D$ and a buffer accumulation amount B in $R_B$ calculator 650 in accordance with the following formula:

$$R_B = B - M_N \times M_D. \tag{5}$$

This correction accumulation buffer amount gives a standard for the buffer amount which can actually be used by means of screen frame skipping. When this value is used to determine a correction buffer amount index $R_{B\text{-}IDX}$, which is scaled to buffer limit value $B_L$, in $R_{B\text{-}IDX}$ calculator 660 according to the following formula:

$$R_{B-IDX} = \frac{256 \, R_B}{B_L}, \tag{6}$$

the smaller this value, the larger the bit value at which fine encoding can be conducted and outputted. Here, the constant 256 of formula (6) indicates the standard data amount of each frame.

Figure 4:
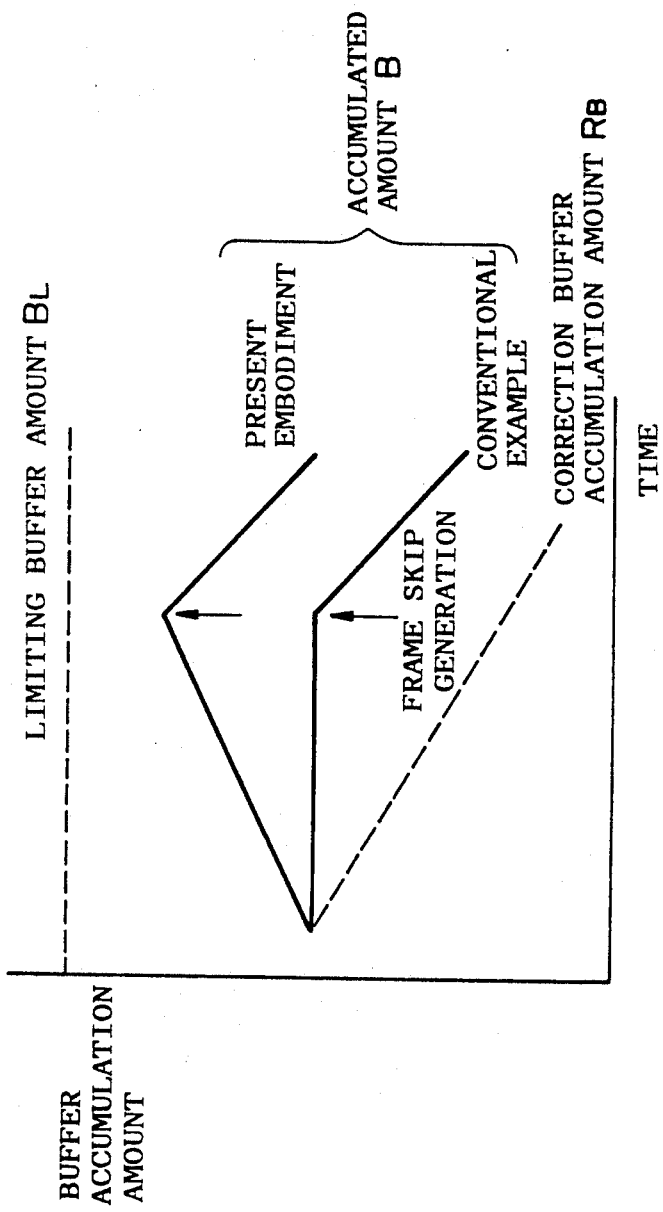
FIG. 4 shows buffer use states of the apparatus of the present invention and a conventional apparatus.

Next, in $Q_S$ calculator 670, $Q_{SO}$ is found using table 1, in which step size $Q_S$ corresponds to values of $R_{B\text{-}IDX}$, this is synchronized with $Q_S$ update signal 67 and set in $Q_S$ register 680, and $Q_S = Q_{SO}$ is outputted. In table 1, the smaller the value of correction buffer amount index $R_{B\text{-}IDX}$, the smaller the step size $Q_S$ which is obtained, and as the frame skip number $S_T$ becomes large and the excess $M_D$ of the usable bit number becomes large (as $R_{B-IDX}$ becomes small) it becomes possible to conduct more detailed quantization. Accordingly, as shown by the buffer accumulation amount B in FIG. 4, in the conventional apparatus, the buffer accumulation amount maintains a nearly constant value prior to frame skip generation; however, in the present preferred embodiment, control is conducted in accordance with a buffer surplus by means of frame skipping in the above-described manner, so that transmission is possible in which the quality of the images is good.

Figure 3:
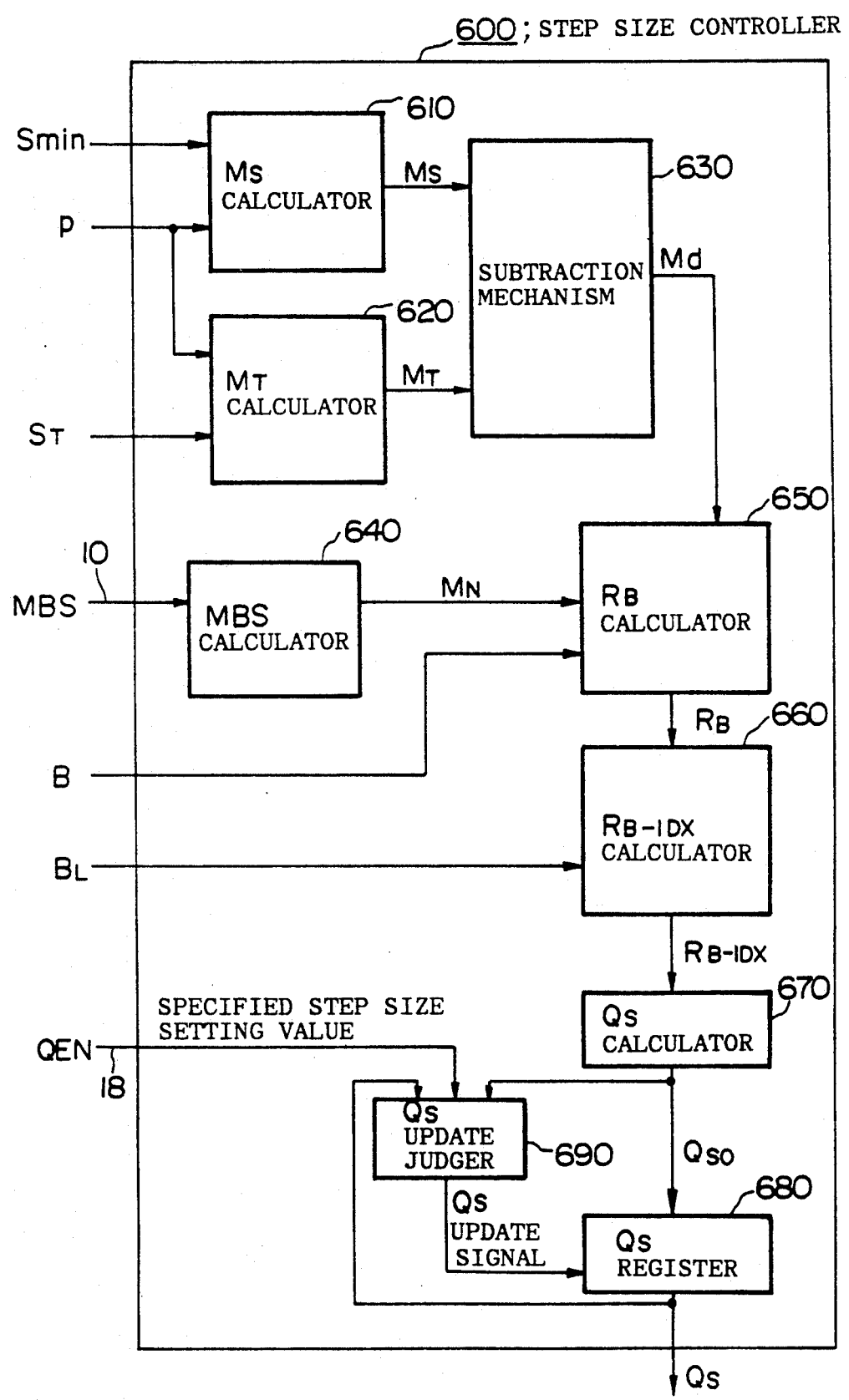
FIG. 3 is a block diagram showing another concrete structural example of the step size controller.

FIG. 3 shows a modification of the structural example of FIG. 2; the method of sending the output $Q_{SO}$ of $Q_S$ calculator 670 to the outside differs, while the remainder is identical. In the present preferred embodiment, a defining step size setting value $Q_{EN}$ is inputted as an externally set signal, and an updating determination is made in accordance with the following formula in $Q_S$ updating judger 690 using this setting value as a threshold.

TABLE 1

| $R_{B-IDX}$ | Step Size $Q_S$ |
|---|---|
| | Qs |
| 0~32 | 2 |
| 33~52 | 4 |
| 53~68 | 6 |
| 69~82 | 8 |
| 83~94 | 10 |
| 95~106 | 12 |
| 107~116 | 14 |
| 117~126 | 16 |
| 127~135 | 18 |
| 136~145 | 20 |
| 146~151 | 22 |
| 152~159 | 24 |
| 160~166 | 26 |
| 167~173 | 28 |
| 174~179 | 30 |
| 180~185 | 32 |
| 186~191 | 34 |
| 192~197 | 36 |
| 198~203 | 38 |
| 204~208 | 40 |
| 209~213 | 42 |
| 214~218 | 44 |
| 219~223 | 46 |
| 224~227 | 48 |
| 228~232 | 50 |
| 233~236 | 52 |
| 237~240 | 54 |
| 241~244 | 56 |
| 245~248 | 58 |
| 249~252 | 60 |
| 253~255 | 62 |

The absolute value of $Q_S - Q_{SO}$ is greater than or equal to $Q_{EN}$.

That is to say, only in cases in which the difference between the newly calculated step size $Q_{SO}$ and the present value $Q_S$ is large and exceeds the set value $Q_{EN}$ is $Q_S$ updated. In accordance with the structure, advantages are gained in that small value corrections of step size $Q_{SO}$ are not conducted, and only a small amount of updating data are necessary.

What is claimed is:

1. An image signal encoding apparatus, comprising:
control means for detecting a degree of redundancy of an inputted image signal and for conducting frame skip control based on a frame skip number determination and a determined skip number;
an encoding processing means for processing a frame signal indicated by a transmission from said control means by block units into which a screen is divided, quantizing said signal, and encoding and outputting said signal through the medium of a transmission buffer; and
step size control means for controlling the step size of said quantization, said step size control means comprising a correction buffer amount calculation means, which calculates a correction buffer amount indicating a surplus in said transmission buffer from said frame skip number and a previously supplied transmission speed;
and a step size calculation means, which outputs a quantization step size which is smaller as said correction buffer amount indicates a larger surplus of said transmission buffer; and
a judgment means for conducting, when a quantization step size is outputted from said step size calculation means, quantization in accordance with said outputted step size only when a difference between said outputted step size and a step size which was immediately previously used exceeds a limit value which is externally supplied.

2. An image signal encoding method comprising:
detecting a degree of redundancy of an inputted image signal;
conducting frame skip control based on a frame skip number determination and a determined skip number;
processing a frame signal indicated by a transmission by block units into which a screen is divided;
quantizing said signal;
encoding and outputting said signal through the medium of a transmission buffer; and
controlling the step size of said quantizing, said controlling comprising:
calculating a correction buffer amount indicating a surplus in said transmission buffer from said frame skip number and a previously supplied transmission speed;
outputting a quantization step size which is smaller as said correction buffer amount indicates a larger surplus of said transmission buffer; and
conducting, when a quantization step size is outputted, quantization in accordance with said outputted step size only when a difference between said outputted step size and a step size which was immediately previously used exceeds a limit value which is externally supplied.

* * * * *